United States Patent [19]

Chesney

[11] Patent Number: 4,744,590
[45] Date of Patent: May 17, 1988

[54] REMOVABLY ATTACHABLE SUSPENDED TRAILER APPARATUS AND METHOD

[76] Inventor: Larry J. Chesney, 2005 Sager, Rockdale, Tex. 76567

[21] Appl. No.: 14,685

[22] Filed: Feb. 13, 1987

[51] Int. Cl.$^4$ .............................................. B60R 9/00
[52] U.S. Cl. ................................ 280/769; 224/42.08; 296/37.1
[58] Field of Search ............................ 280/769, 42.07; 224/42.08, 42.04, 42.21, 42.43, 42.44, 42.03 A, 42.03 B; 296/37.1, 37.2

[56] References Cited

U.S. PATENT DOCUMENTS

| | | | |
|---|---|---|---|
| 1,927,922 | 9/1933 | Crum | 296/37.1 |
| 3,913,811 | 10/1975 | Spencer | 224/42.08 |
| 3,999,693 | 12/1976 | Cooper, Sr. | 291/37.1 |
| 4,403,716 | 9/1983 | Carlson et al. | 224/42.08 |
| 4,412,635 | 11/1983 | Bateman | 224/42.07 |
| 4,593,840 | 6/1986 | Chown | 280/769 |

FOREIGN PATENT DOCUMENTS 0099809  1/1984  European Pat. Off. ......... 224/42.07

*Primary Examiner*—Richard A. Bertsch
*Attorney, Agent, or Firm*—J. Nevin Shaffer, Jr.

[57] ABSTRACT

A removable attachable suspended trailer device for providing additional luggage capacity for vehicles on a temporary basis. The suspended trailer is constructed of light weight material providing a frame to which are attached a number of parallel strength members. The central strength member attached to the frame also has a means for connecting the frame to the towed vehicle. The suspended trailer additionally includes retractable support legs which are held in the upright position while the device is being towed so that nothing touches the ground from the trailer when the trailer is in use. When the towing vehicle is stopped, the legs are placed in the downward and locked position and the suspended trailer is disconnected from the towing vehicle. The provision of wheels on the legs of the device enables the loaded suspended trailer, when unattached, to be rolled to any desired location for convenient unloading. Because the invention is suspended from the towing vehicle, no confusing and difficult trailer maneuvering knowledge is necessary as the suspended trailer follows the vehicle wherever it goes. Additionally, the suspended trailer is simple to install and remove, easy to load, does not appreciably add to wind resistance and is easy to store once use is no longer required.

2 Claims, 5 Drawing Sheets

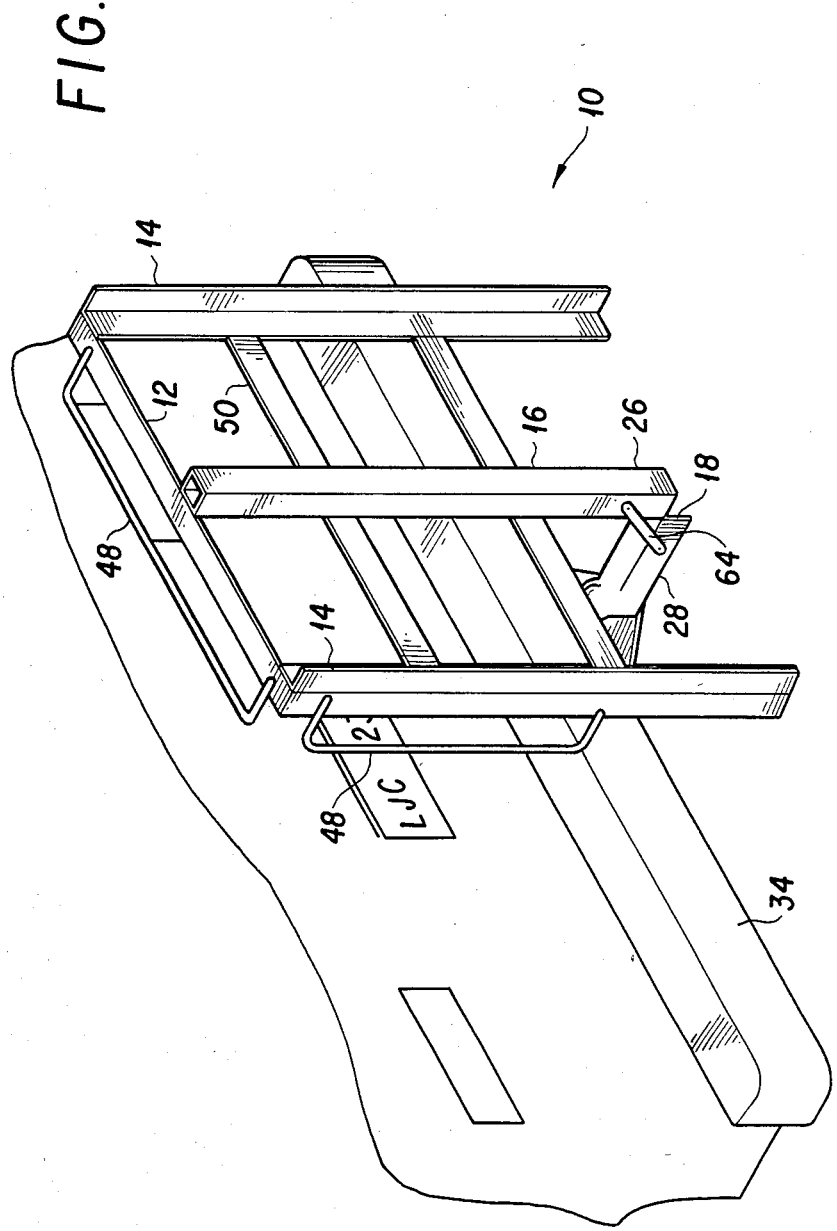

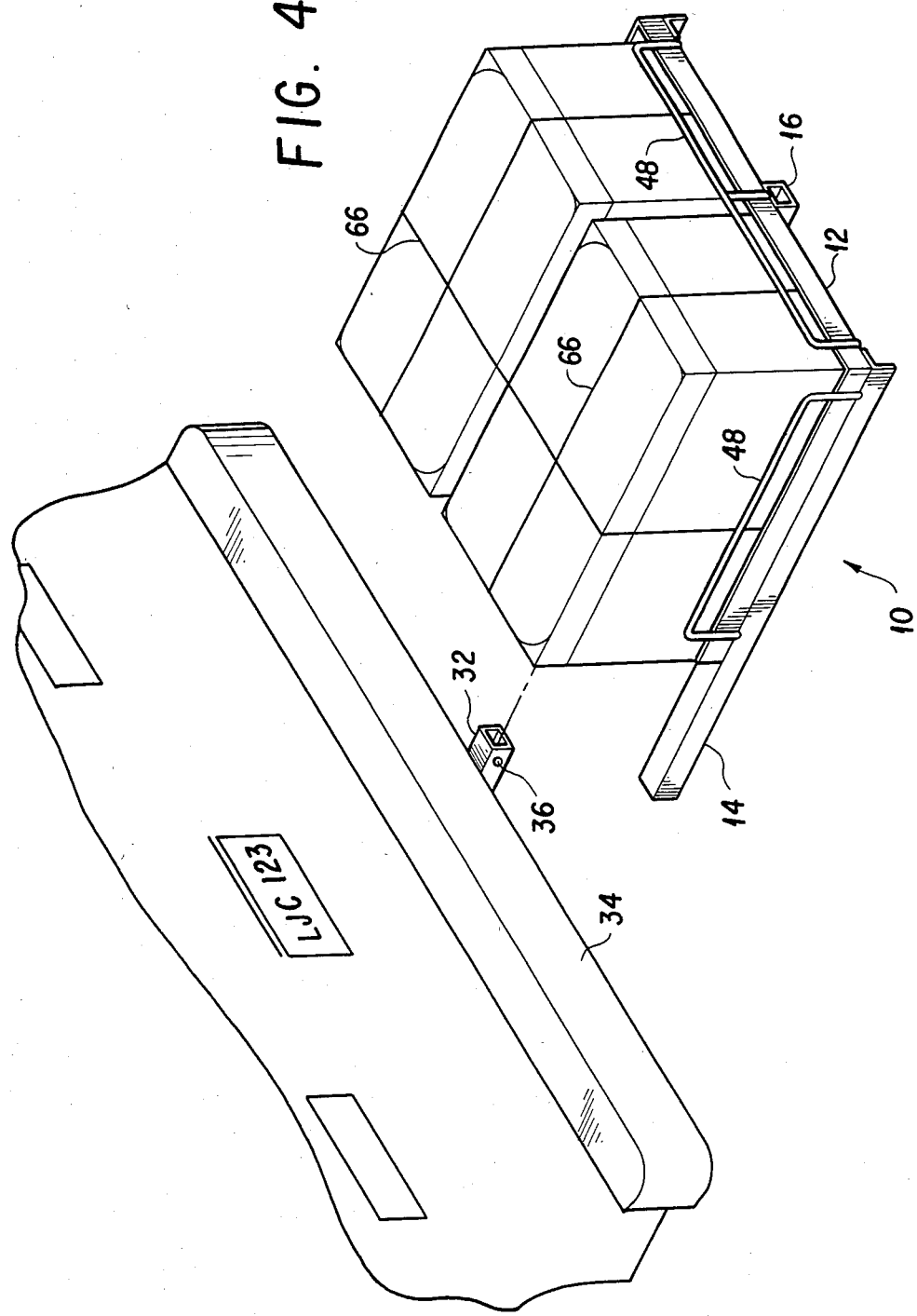

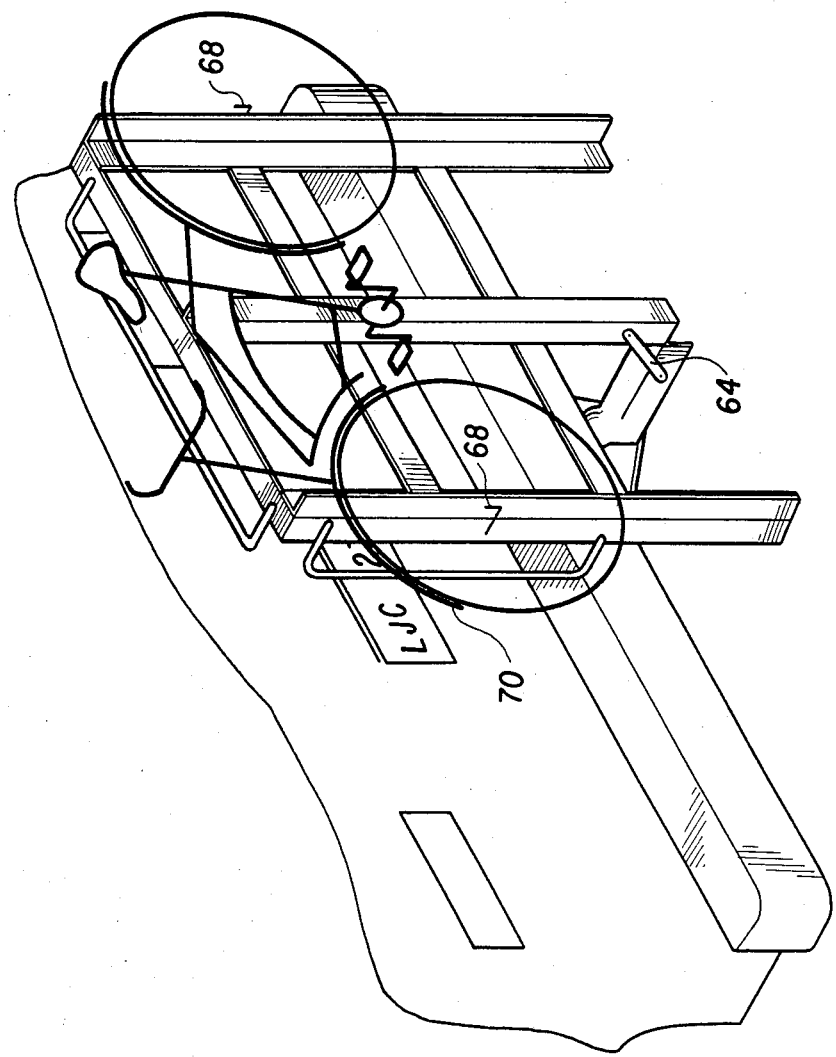

REMOVABLY ATTACHABLE SUSPENDED TRAILER APPARATUS AND METHOD

BACKGROUND OF THE INVENTION

This invention relates to an improved removably attachable suspended trailer device.

Devices for expanding the cargo capacity for ordinary passenger vehicles have been known in the art for quite some time. For example, a combined automobile trunk and accessory drawer is disclosed in CRUM U.S. Pat. No. 1,927,922, which is a box which is physically inserted into a prefabricated hole in the rear of the automobile body. The box has a lockable lid that opens to disclose luggage contained therein and a closeable drawer that contains a spare tire and auto tools. A more modern device is disclosed in COOPER U.S. Pat. No. 3,999,693, wherein a complete trunk including bumper and gas fill means is added to the rear of a compact car. This device is a more or less permanent addition to the vehicle secured in place by brackets and wires.

A drawback to the devices known in the art, is that they require substantial modification to the vehicle itself for proper utilization or they require extensive, more or less permanent attachments to the vehicle in order to obtain the benefit of added carrying space. Other possible solutions to the problem of increasing luggage capacity, such as strapping a carrier to the roof of the vehicle, towing a wheeled trailer behind the vehicle or renting an independent trailer truck have obvious disadvantages.

The principal disadvantages of attaching car top carriers to a vehicle are that they are difficult to install, difficult to load and unload due to their awkward positioning, they tend to damage the vehicle by installation and removal of the carrier itself, they increase airflow restrictions thus decreasing gas mileage to the car, and they are bulky and difficult to store once removed.

The principal disadvantages of attaching a towed trailer to the rear of the vehicle is a noticeable reduction in gas mileage, difficulty in towing a wheeled trailer due to lack of experience that the typical driver has with towing and the commensurate difficulty the typical driver has simply driving, changing lanes and parking with a towed trailer.

Thus, there is a need in the art for providing a removably attachable suspended trailer which is not difficult to install and which is light weight, easy to load and unload, and easy to store. It, therefore, is an object of this invention to provide an improved removably attachable suspended trailer that is light weight, easy to install and small enough to handle and store easily. It is a further object of the invention to provide a suspended trailer that does not appreciably add to airflow restrictions, which is not difficult to tow and which is no more difficult to drive and park than the ordinary vehicle itself.

SHORT STATEMENT OF THE INVENTION

Accordingly, the removably attachable suspended trailer device of the present invention includes a frame having a number of parallel strength members mounted underneath the frame to provide support and rigidity for the frame. An optional cross member or members may be provided to fully enclose the interior of the frame in order to provide a resting place for the luggage or simply to increase the strength of the frame itself.

The device anticipates the utilization of a frame receiving means mounted to the towing vehicle. The form of the frame receiving means may take is variable. That is, the frame receiving means may be in the form of a male ball draw bar or it may be in the form of a female socket. In any event, these devices are attached in the normal manner to the rear of a towing vehicle as is known in the art. This connection typically takes only a few moments and may be left in place without undue marring or obstruction of the vehicle when the device is not in use. An inter-connecting means is attached to the central strength member of the frame and is designed to correspond with whatever frame receiving means is utilized. That is, if a male ball draw bar is utilized on the towing vehicle, a typical cap covering hitch would be attached to the frame strength member for connection to the draw bar. Likewise, if a female receptacle is attached to the towing vehicle, a male probe is provided on the frame strength member that just fits within the receptacle. Both types are retained in place by means of a bolt that passes through both, or by any other means for securing the female section on the male draw bar or the male probe within the female socket that is commonly know in the art.

The outermost parallel strength members are designed to ride just underneath the bumper of the towed vehicle in order that when the frame is secured within the frame receiving means the outermost strength members assist in resisting the downward movement of the device, assist in preventing side to side movement of the device and provide rotational and vibration stabilization of the device.

Also included are retractable support means attached to the corners of the frame which can be held in a upward retracted position by means of a lock or dropped and held in the dropped position by means of the same lock. Attached to the base of the support means are wheels, casters or any other desired means for allowing the frame, when unattached, to be rolled from one place to another.

A further improvement includes a hinge located on the central strength member close to the inner connecting means that enables an unloaded frame to be tilted in the upward vertical position while still attached to the towing vehicle. This improvement enables the device to be transported simply and safely without the need for removing the device altogether. Additionally, when placed in this upward position the device serves as a carrying frame for skis, bicycles, etc.

The present invention also includes the attachment of communication means such as radio antennas, T.V. antennas, or the like to the frame. Also, attached to the frame for night time use are the full assortment of lighting systems common to the typical trailer including brake, signal, clearance lights and reflectors.

Because the frame is suspended from the towed vehicle and does not come into contact with the road, it is no more difficult to drive a vehicle with this unique expanded trailer device than an ordinary vehicle. Further, this device is light weight, easy to install and remove and stores easily.

BRIEF DESCRIPTION OF THE DRAWINGS

Other objects, features and advantages of the present invention will become more fully apparent from the following detailed description of the preferred embodiment, the appended claims and the accompanying drawings in which:

FIG. 3 is a plan view of the device, attached to a towing vehicle demonstrating the hinge which enables the device to be transported while attached in a vertical position;

FIG. 4 is a plan view of the device, ready to be attached to a towing vehicle demonstrating a load being carried and the tie downs; and FIG. 5 is a plan view of the device in the raised, locked position used for transporting a bicycle.

DETAILED DESCRIPTION OF THE PREFERRED EMBODIMENT

Figure 1:
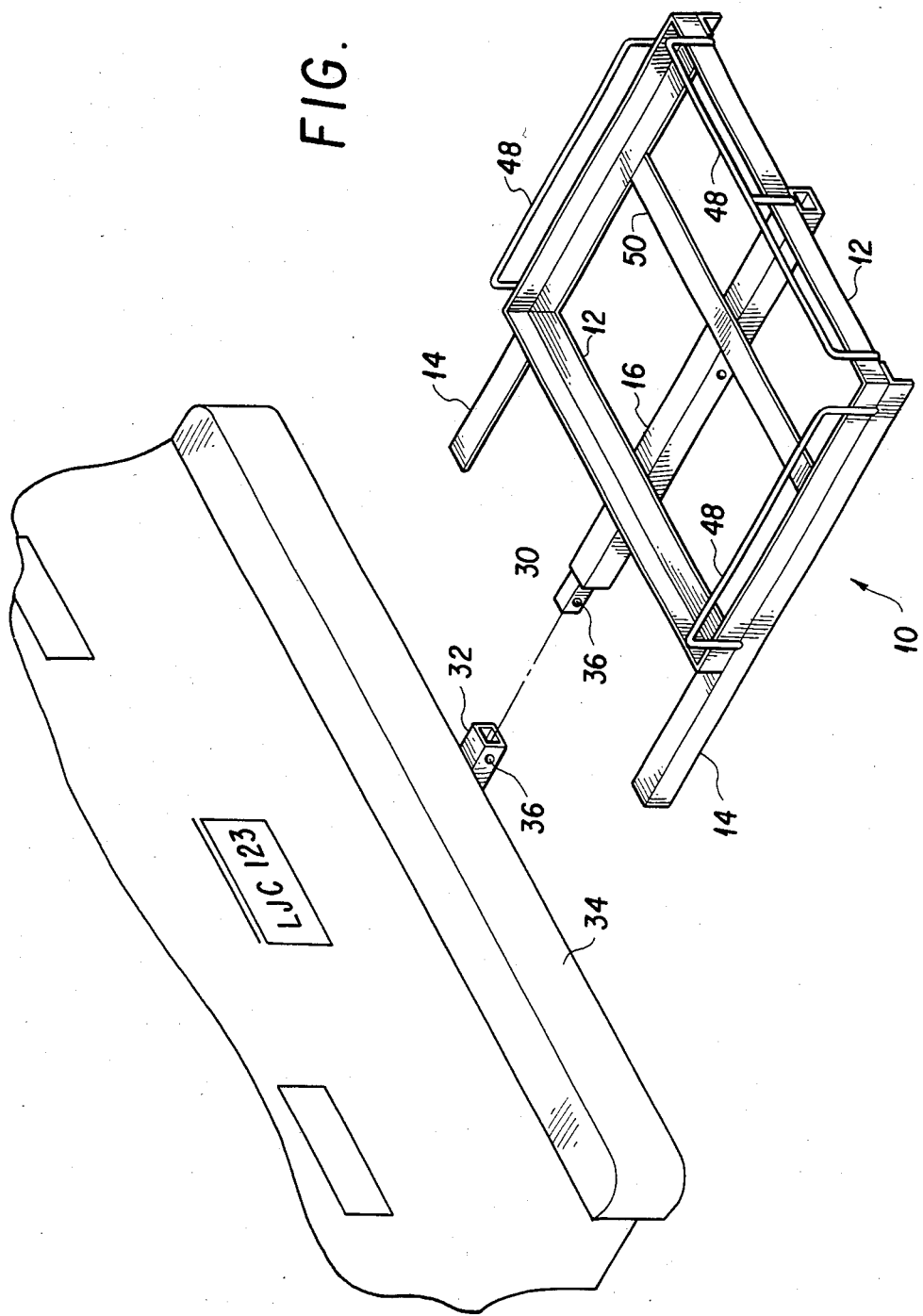
FIG. 1 is a plan view of a preferred embodiment of the removably attachable suspended trailer.

The preferred embodiment of the present invention is illustrated by way of example in FIGS. 1-5. With specific reference to FIG. 1, device 10 includes a frame 12 which is in the form of a rectangle. Attached to the underside of frame 12 are a number of parallel strength members 14. The two outermost strength members 14 are formed of L-shaped angle iron, aluminum, or any other strong light weight material. Center strength member 16 is the primary load bearing support for device 10. Center strength member 16, as shown in FIG. 1, is rectangularly shaped and hollow in order to provide for lightness. Nonetheless, it is obvious that center strength member 16 may be of any given shape and either hollow or solid depending on the need or the desire.

FIG. 1 further illustrates male insert 30 designed to just fit within female receptacle 32 which has previously been securely attached to towing vehicle 34 by any ordinary means known in the art, such as bolts, and not shown herein. Female receptacle 32 and male insert 30 have a corresponding retaining hole 36 drilled completely through both male insert 30 and female receptacle 32. As a result, any ordinary retaining means such as a bolt or a threaded screw may be inserted through retaining holes 36 thereby preventing device 10 from being withdrawn from female receptacle 32 without the removal of the aforementioned bolt, which bolt is of ordinary design and not shown herein. Strength members 14 are also securely attached to the frame 12 by any ordinary means known in the art, such as bolts, welding, etc. not shown herein.

Figure 2:
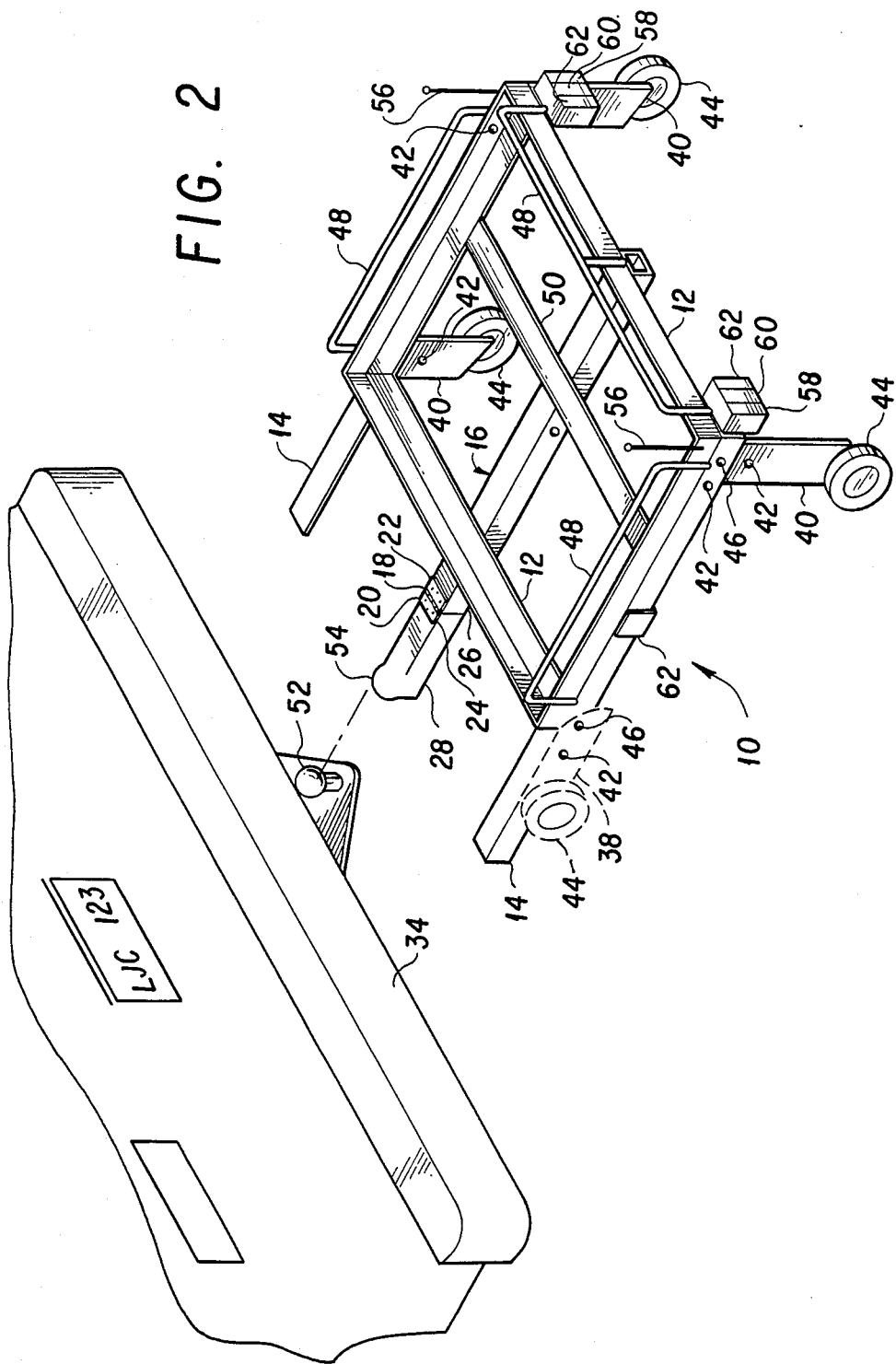
FIG. 2 is a plan view of the device attached to a towing vehicle by means of a male draw bar and hitch connection showing the retractable legs both in the up and down positions.

FIG. 2 further illustrates a number of retractable supports 38 comprised of legs 40, locks 42 and wheels 44. Retractable supports 38 are movably attached to frame 12 by attachments 46 such as a bolt, a washer and a nut or any other attaching means commonly know in the art that allows the legs 40 to fold up and be extended while securely attaching legs 40 to frame 12. Wheels 44 may be of any of a variety of designs including, but not limited to, standard rubber wheels, casters, or the like such as are known in the art.

The locking means for legs 40 can be of any design known in the art. In this embodiment locks 42 are created by forming corresponding holes through strength members 14 and legs 40 when in the raised position. Then a bolt or retaining pin or the like, not shown, can be inserted through the corresponding holes and the legs 40 held in the raised position for transporting device 10.

When it is desired to roll device 10 away from vehicle 34, the retaining pin is removed from corresponding holes 42 and the leg 40 lowered. Then, because hole 42 has been located on member 14 just beyond the width of leg 40, when lowered, when retaining pin is reinserted into hole 42 on strength member 14 legs 40 are prevented from collapsing forward towards vehicle 34. The top rear of leg 40 comes in contact with the underside of strength member 14 and prevents the legs 40 from collapsing, when extended, away from vehicle 34.

Near the base of center strength member 16 is hinge 18 with two hinge plates 20 and 22 secured to the top of center strength member 16 by fasteners 24 which may be metal screws, bolts, welding, or any other fastening means known in the art. Center strength member 16 is completely cut in half and joined together at hinge means 18 so that extended side 26 matches exactly with short side 28 so that extended side 26 and short side 28 provide support to center strength member 16 while being joined at hinge 18.

Also illustrated in FIGS. 1 and 2 are tie down rails 48 attached to frame 12 by welding or any other permanent attaching method known in the art and cross support and strength member 50 attached at both ends to frame 12 and to center strength member 16.

Referring again to FIG. 2, another embodiment of a means for attaching device 10 to towing vehicle 34 is illustrated by means of male draw bar 52 and female receptacle 54 attached, respectively, to towing vehicle 34 and the base of center strength member 16 by any conventional manner known in the art.

Also illustrated in FIG. 2 are antennas 56, signal and clearance lights 58, brake lights 60 and reflectors 62. Antennas 56, signal and clearance lights 58, brake lights 60 and reflectors 62 are all connected by electrical wires to the electrical system of towing vehicle 34 by means of electrical wires and connections commonly known in the art and not described further herein.

FIG. 2 also illustrates one of the retractable supports 38 in the upward or retracted position as shown by dotted lines.

Referring now to FIG. 3, device 10 is shown in the up right or vertical position made possible by hinge 18 and thereby enabling frame 12 to fold upward towards towing vehicle 34 for convenience during short periods of time between use of device 10.

Frame lock 64 is shown attached to short side 28 and extended side 26 of center member 16 thereby holding frame 12 in the upward position. This is accomplished by drilling holes in sides 28 and 26 and the ends of lock 64 and matching these holes when frame 12 is raised and inserting retaining pins, not shown, therethrough to hold device 10 in this position. Lock 64 is of a strong material such as metal. Holes for lock 64 may pass all the way through sides 28 and 26 so that the retaining pins may be grasped by nuts, etc. on the side opposite lock 64 thereby preventing inadvertent removal of the pins.

FIG. 4 is a plan view of device 10 ready to be attached to towing vehicle 34. This figure illustrates the device 10 when fully loaded, and secured in position by tie downs 66, ropes, cords, etc., secured to tie down rails 48.

FIG. 5 shows device 10 in the raised position for traveling. As a further embodiment, device 10 has hangers 68, attached by welding or any other convenient means known in the art, to outside of supports 14 in opposite positions. As a result, device 10 is capable of acting as an alternative carrying means for bicycles or skis, sleds, etc., not shown.

In operation, rectangularly shaped frame 12 is constructed of light weight aluminum or any other strong, yet light weight material such as stainless steel, plastic, or the like. A number of strength members 14 are attached beneath frame 12 so that frame 12 in effect rests on strength members 14. The connection of strength members 14 to frame 12 is done by welding, super adhesives, or any other means commonly know in the art. Center strength member 16 is the primary load bearing member and, unlike strength members 14, which may be comprised of L-shaped angle irons or the like, is fully enclosed in rectangular shape as illustrated. Center strength member 16 may be hollow in order to provide for lightness or solid should the user desire. In any event, center strength member 16 is securely attached by welding or any other effective means to frame 12. Center strength member 16 is cut in half so that there is an extended side 26 and a short side 28. Extended side 26 and short side 28 are joined together by hinge 18 with hinge plates 20 and 22 secured to center strength member 16 by fasteners 24 which may be metal screws, bolts, or any other fastener known in the art. As a result, device 10 is enabled to move from the horizontal position which is standard when in use, to a vertical position when in disuse, thereby enabling the user to travel with the device 10 up and empty.

As illustrated in FIGS. 1 and 2, a variety of attachment means are illustrated for connecting device 10 to towing vehicle 34. In FIG. 1, the combination of male insert 30 and and female receptable 32 is utilized wherein male insert 30 just fits within female receptacle 32 and is retained in place by means of utilization of a retaining hole 36 which is drilled completely through both male insert 30 and female receptacle 32 so that a bolt or some other retaining means may be passed through retaining hole 36 and secured in place, thereby effectively preventing the unintentional withdrawal of male insert 30 from female receptacle 32.

FIG. 2 illustrates another embodiment of the device wherein male draw bar 52 and female receptacle 54 are utilized in combination to secure device 10 to towing vehicle 34. The draw bar 52 and receptacle 54 are of ordinary design commonly known in the art and are not disclosed or discussed further herein. Further, it is known that there are means to secure receptacle 54 to draw bar 52 so that receptacle 54 does not inadvertently or unintentionally become unattached from draw bar 52 without the user's assistance.

FIG. 2 also illustrates additional embodiments of the invention whereby antennas 56 are attached to frame 12 so that T.V., radio, telephone and other communications may be transmitted from and be received by the car. Antennas 56 also serve the additional purpose of providing indicators for the rear of device 10 to assist the driver in his awareness of the location of the device. Antennas 56 may be of any conventional design capable of telescoping to various heights or of a fixed height nature. Additionally, FIG. 2 illustrates device 10 in an embodiment comprising signal and clearance lights 58, brake lights 60 and reflectors 62 so that device 10 has the ability to be driven safely at night and to give the standard and required traffic signals and warnings to following traffic.

FIG. 2 also illustrates retractable supports 38 with legs 40, locks 42, and wheels 44. As shown in FIG. 2, some retractable supports 38 are in the lowered and locked position so that when all supports 38 are lowered and device 10 is positioned in the desired location, device 10 can be disconnected from towing vehicle 34 and then rolled to any convenient location for unloading.

As also shown in FIG. 2, when being towed, retractable supports 38 are in the retracted position and are not utilized for control or support while the device 10 is being towed. Support, once again, comes primarily from center strength member 16 and is aided in its prevention of side to side rotation by strength members 14 which extend under and come in contact with the towing vehicle's 34 bumper of other structural member and thereby provide a dual function of aiding in the support of device 10 and preventing any unwanted side to side and/or rotational motion.

FIGS. 1 and 2 also illustrate cross support and strength member 50 attached to frame 12 and to center strength member 16 which thereby increases the rigidity of frame 12 and provides a base upon which material may be stored. Although not shown, it is obvious that additional cross support and strength members 50 might be added so that a solid base for frame 12 could be accomplished or so that a base of some other material such a plywood, plastic, sheet metal or the like could be inserted and held within frame 12 for the same purpose of supporting the carried material.

As illustrated in all FIGURES, tie down rails 48 are provided so that once the subject material is loaded on device 10 a tarp or some other covering means may be utilized to cover and protect the material (not shown) and then, rope, nylon, stretch cord, or the like, may be used to secure the tarp and the material to frame 12 in conjunction with the utilization of tie down rails 48.

FIG. 3 demonstrates an additional embodiment of the device 10 with hinge 18 so that when desired, if device 10 is empty, frame 12 may be tilted in the vertical position and held there by any conventional means such as a frame lock 64, or a brace, or rope not shown, for convenience in between use, for traveling after material has been unloaded from device 10, or for carrying bicycles, skis, etc. as illustrated in FIGURES.

While the removably attachable suspended trailer device of the present invention has been disclosed in conjunction with a towing vehicle, such as a car, it should be appreciated that the device can be used with other vehicles, trucks, or the like. The present invention provides an improved, light weight, easily installed and removable means whereby the user can easily and temporarily expand the carrying capacity of the vehicle. The present invention does not appreciably add to wind resistance, does not damage the vehicle utilized to tow the device, is easy to drive and maneuver, since no wheels or any portion of the device touches the ground while the vehicle is moving, and is easy to store once used. Thus, the suspended trailer of the present invention has the important advantage of providing a safe means for adding carrying space to a vehicle which does not require extensive trailer handling experienc.

While the present invention has been disclosed in connection with the preferred embodiment thereof, it should be understood that there may be other embodiments which fall within the spirit and scope of the invention as defined by the following claims.

What is claimed is:

1. A removably attachable suspended trailer comprising:
   (a) a frame;

(b) a plurality of parallel strength members mounted on said frame;
(c) a frame receiving means adapted to be mounted on a towing vehicle;
(d) means interconnecting said frame and said frame receiving means for removably suspending said frame from said frame receiving means;
(e) a plurality of legs rotatably attached to the underside of said frame for supporting said suspended trailer at each corner upon the removal of said interconnecting means from said receiving means;
(f) means for locking said legs in a retracted position when said frame is attached to a towing vehicle and for locking said legs in an extended position when said frame is standing alone;
(g) wheel means attached to said legs so that when said legs are locked in said extended position and said frame is standing alone, said frame may be rolled from one place to another;
(h) tie down rail means for use in securing transported materials to said frame;
(i) hinge means in said interconnecting means for enabling the raising of said frame from a horizontal to a vertical position; and
(j) support and anti-rotational strength member means attached to said frame and adapted to contact towing vehicle at spaced intervals and support said frame and inhibit side to side rotation of said frame.

2. A method for providing a removably attachable suspended trailer comprising the steps of:
(a) constructing a frame;
(b) mounting a plurality of parallel strength members on said frame;
(c) mounting a frame receiving means on a towing vehicle;
(d) providing a means interconnecting said frame and said frame receiving means for removably suspending said frame from said frame receiving means;
(e) rotatably attaching a plurality of legs to the underside of said frame at each corner for supporting said suspended trailer upon the removal of said interconnecting means from said frame receiving means;
(f) providing a locking means for locking said legs in a retracted position when said frame is attached to said towing vehicle and for locking said legs in an extended position when said frame is standing alone;
(g) attaching wheel means to said legs so that when said legs are locked in said extended position and said frame is standing alone, said frame may be rolled from one place to another;
(h) attaching tie down rail means to said frame for use in securing transported materials to said frame;
(i) attaching a hinge means to said interconnecting means for enabling the raising of said frame from a horizontal to a vertical position; and
(j) attaching a support and anti-rotational strength member means attached to said frame that contacts said towing vehicle at spaced intervals and supports said frame and inhibits side to side rotation of said frame.

* * * * *